(12) United States Patent
Kraehenbuehl et al.

(10) Patent No.: US 7,840,473 B2
(45) Date of Patent: Nov. 23, 2010

(54) ON-LINE REINSURANCE CAPACITY AUCTION SYSTEM AND METHOD

(75) Inventors: Martin Kraehenbuehl, Thalwil (CH); Christian Mumenthaler, Zurich (CH); Ralph Walter, Thalwil (CH)

(73) Assignee: Swiss Reinsurance Company, Zurich (CH)

( * ) Notice: Subject to any disclaimer, the term of this patent is extended or adjusted under 35 U.S.C. 154(b) by 1661 days.

(21) Appl. No.: 09/967,045

(22) Filed: Oct. 1, 2001

(65) Prior Publication Data
US 2002/0046067 A1 Apr. 18, 2002

Related U.S. Application Data

(60) Provisional application No. 60/236,713, filed on Oct. 2, 2000.

(51) Int. Cl.
*G06Q 40/00* (2006.01)
(52) U.S. Cl. ....................................................... 705/37
(58) Field of Classification Search .................... 705/4, 705/37
See application file for complete search history.

(56) References Cited

U.S. PATENT DOCUMENTS

| | | | |
|---|---|---|---|
| 5,191,522 A | 3/1993 | Bosco et al. | |
| 5,523,942 A * | 6/1996 | Tyler et al. | 705/4 |
| 5,573,244 A | 11/1996 | Mindes | |
| 5,657,460 A | 8/1997 | Egan et al. | |
| 5,673,402 A * | 9/1997 | Ryan et al. | 705/38 |
| 5,704,029 A | 12/1997 | Wright, Jr. | |
| 5,704,045 A | 12/1997 | King et al. | |
| 5,732,397 A | 3/1998 | DeTore et al. | |
| 5,752,236 A | 5/1998 | Sexton et al. | |

(Continued)

FOREIGN PATENT DOCUMENTS

CA 2180995 1/1998

(Continued)

OTHER PUBLICATIONS

Stock Research Pro: Calculate and Interpret the Return on Sales Ratio, www.stockresearchpro.com, Oct. 2009, pp. 1-2.*

(Continued)

*Primary Examiner*—Hani Kazimi
*Assistant Examiner*—Bijendra K Shrestha
(74) *Attorney, Agent, or Firm*—Oblon, Spivak, McClelland, Maier & Neustadt, L.L.P.

(57) ABSTRACT

A system and method of selling reinsurance includes identifying a reinsurance product and a capacity of the reinsurance product to be sold and calculating a fair risk price for the reinsurance product. The reinsurance product is then offered to potential buyers via an electronic auction, wherein a minimum bid in the electronic auction is determined, at least in part, by the fair risk price. Bids are received from the buyers for portions of the capacity of the reinsurance product and are ranked in accordance with a calculated profitability value and/or time of receipt. Buyers are notified of a status of their respective bids, and particularly, whether bids have been tentatively accepted, partially accepted, or excluded, i.e., rejected. Upon notification of bid status, buyers are given the opportunity to modify bid parameters in an attempt to have their bids ranked at higher a level, thereby increasing the chance of the bid being accepted.

19 Claims, 9 Drawing Sheets

AUCTION RANKING ELEMENT

| | | |
|---|---|---|
| ARE ID | 5131 | 41 |
| AUCTION ID | 322 | 42 |
| BID ID | 2057 | 43 |
| PROFITABILITY | 3.5 | 44 |
| CONSUMED CAPACITY | 20 MIL | 45 |
| STATUS ID | PARTIAL OK | 46 |
| RANK | 8 | 47 |
| TIME | 14:22:01 07/14/2001 | 48 |
| UPDATED | YES | 49 |

U.S. PATENT DOCUMENTS

| | | | |
|---|---|---|---|
| 5,752,237 A | 5/1998 | Cherny | |
| 5,754,980 A | 5/1998 | Anderson et al. | |
| 5,758,126 A | 5/1998 | Daniels et al. | |
| 5,806,042 A | 9/1998 | Kelly et al. | |
| 5,832,465 A | 11/1998 | Tom | |
| 5,839,113 A | 11/1998 | Federau et al. | |
| 5,842,148 A | 11/1998 | Prendergast et al. | |
| 5,842,921 A | 12/1998 | Mindes et al. | |
| 5,852,808 A | 12/1998 | Cherny | |
| 5,873,066 A | 2/1999 | Underwood et al. | |
| 5,966,716 A | 10/1999 | Comer et al. | |
| 5,978,769 A | 11/1999 | Brown et al. | |
| 5,978,820 A | 11/1999 | Mase et al. | |
| 5,983,268 A | 11/1999 | Freivald et al. | |
| 5,991,733 A | 11/1999 | Aleia et al. | |
| 6,023,685 A | 2/2000 | Brett et al. | 705/37 |
| 6,049,772 A | 4/2000 | Payne et al. | |
| 6,049,773 A * | 4/2000 | McCormack et al. | 705/4 |
| 6,078,890 A | 6/2000 | Mangin et al. | |
| 6,084,585 A | 7/2000 | Kraft et al. | |
| 6,137,488 A | 10/2000 | Kraft et al. | |
| 6,321,212 B1 | 11/2001 | Lange | |
| 6,332,125 B1 | 12/2001 | Callen et al. | |
| 6,343,272 B1 | 1/2002 | Payne et al. | |
| 6,411,936 B1 | 6/2002 | Sanders | |
| 6,411,939 B1 | 6/2002 | Parsons | |
| 6,460,021 B1 | 10/2002 | Kirksey | |
| 6,526,386 B1 | 2/2003 | Chapman et al. | |
| 6,594,635 B1 * | 7/2003 | Erlanger | 705/4 |
| 6,604,080 B1 | 8/2003 | Kern | |
| 6,609,112 B1 * | 8/2003 | Boarman et al. | 705/37 |
| 6,647,373 B1 * | 11/2003 | Carlton-Foss | 705/37 |
| 6,871,191 B1 * | 3/2005 | Kinney et al. | 705/37 |
| 7,010,511 B1 * | 3/2006 | Kinney et al. | 705/37 |
| 7,062,460 B1 * | 6/2006 | Growney et al. | 705/37 |
| 7,080,020 B1 * | 7/2006 | Klaus | 705/4 |
| 7,165,043 B2 * | 1/2007 | Keyes et al. | 705/36 R |
| 7,200,570 B1 * | 4/2007 | Wu | 705/37 |
| 2001/0027437 A1 | 10/2001 | Turbeville et al. | |
| 2001/0028364 A1 | 10/2001 | Fredell et al. | |
| 2001/0037274 A1 | 11/2001 | Monticciolo | |
| 2001/0044734 A1 | 11/2001 | Walker et al. | |
| 2001/0047325 A1 | 11/2001 | Livingston | |
| 2001/0053986 A1 | 12/2001 | Dick | |
| 2002/0002475 A1 | 1/2002 | Freedman et al. | |
| 2002/0004731 A1 | 1/2002 | Belben | |
| 2002/0029158 A1 | 3/2002 | Wolff et al. | |
| 2002/0032586 A1 | 3/2002 | Joao | |
| 2002/0032646 A1 * | 3/2002 | Sweeney et al. | 705/38 |
| 2002/0035489 A1 | 3/2002 | Herman et al. | |
| 2002/0035528 A1 | 3/2002 | Simpson et al. | |
| 2002/0042770 A1 | 4/2002 | Slyke et al. | |
| 2002/0046066 A1 * | 4/2002 | Laurenzano | 705/4 |
| 2002/0049617 A1 | 4/2002 | Lencki et al. | |
| 2002/0069077 A1 | 6/2002 | Brophy et al. | |
| 2002/0069155 A1 | 6/2002 | Nafeh et al. | |
| 2002/0077866 A1 | 6/2002 | Javerlhac | |
| 2002/0077868 A1 | 6/2002 | Javerlhac | |
| 2002/0078046 A1 | 6/2002 | Uluakar et al. | |
| 2002/0082874 A1 | 6/2002 | Go | |
| 2002/0082875 A1 | 6/2002 | Best-Devereux | |
| 2002/0091553 A1 | 7/2002 | Callen et al. | |
| 2002/0091624 A1 | 7/2002 | Glodjo et al. | |
| 2002/0091991 A1 | 7/2002 | Castro | |
| 2002/0095317 A1 | 7/2002 | McCabe | |
| 2002/0099640 A1 | 7/2002 | Lange | |
| 2002/0111833 A1 | 8/2002 | Dick | |
| 2002/0116227 A1 | 8/2002 | Dick | |
| 2002/0120776 A1 | 8/2002 | Eggebraaten et al. | |
| 2002/0138307 A1 | 9/2002 | Kramer | |
| 2002/0143583 A1 | 10/2002 | Reader et al. | |
| 2002/0143584 A1 | 10/2002 | Lundegren | |
| 2002/0147670 A1 | 10/2002 | Lange | |
| 2002/0152098 A1 | 10/2002 | Evans et al. | |
| 2002/0156656 A1 | 10/2002 | Harrell et al. | |
| 2002/0156658 A1 | 10/2002 | Selesny et al. | |
| 2002/0156709 A1 | 10/2002 | Andrus et al. | |
| 2002/0169715 A1 | 11/2002 | Ruth et al. | |
| 2002/0174042 A1 | 11/2002 | Arena et al. | |
| 2002/0174046 A1 | 11/2002 | Mistretta | |
| 2002/0188540 A1 | 12/2002 | Fay et al. | |
| 2002/0194053 A1 | 12/2002 | Barrett et al. | |
| 2002/0194098 A1 | 12/2002 | Stiff et al. | |
| 2002/0194131 A1 | 12/2002 | Dick | |
| 2002/0198802 A1 | 12/2002 | Koresko | |
| 2003/0004759 A1 | 1/2003 | Chapman et al. | |
| 2003/0009355 A1 | 1/2003 | Gupta | |
| 2003/0009359 A1 | 1/2003 | Weidner et al. | |
| 2003/0014342 A1 | 1/2003 | Vande Pol | |
| 2003/0018497 A1 | 1/2003 | Luedtke | |
| 2003/0018576 A1 | 1/2003 | Zuckerbrot et al. | |
| 2003/0023544 A1 | 1/2003 | Chodes | |
| 2003/0028405 A1 | 2/2003 | Chapman et al. | |
| 2003/0028479 A1 | 2/2003 | Kirksey | |
| 2003/0046115 A1 | 3/2003 | Hisano | |
| 2003/0055778 A1 | 3/2003 | Erlanger | |
| 2003/0061075 A1 | 3/2003 | Heckman et al. | |
| 2003/0065540 A1 | 4/2003 | Callen et al. | |
| 2003/0074233 A1 | 4/2003 | Lee | |
| 2003/0074235 A1 | 4/2003 | Gregory | |
| 2003/0078215 A1 | 4/2003 | Parsons | |
| 2003/0078816 A1 | 4/2003 | Filep | |
| 2003/0083972 A1 | 5/2003 | Williams | |
| 2003/0083975 A1 | 5/2003 | O'Grady et al. | |
| 2003/0088430 A1 | 5/2003 | Ruark | |
| 2003/0115128 A1 | 6/2003 | Lange et al. | |
| 2003/0125108 A1 | 7/2003 | Groz | |
| 2003/0126155 A1 | 7/2003 | Parker et al. | |
| 2003/0130920 A1 | 7/2003 | Freund | |
| 2003/0135395 A1 | 7/2003 | Carfi et al. | |
| 2003/0144888 A1 | 7/2003 | Baron et al. | |
| 2003/0154094 A1 | 8/2003 | Bredemeier et al. | |
| 2003/0167220 A1 | 9/2003 | Schoen et al. | |
| 2003/0195776 A1 | 10/2003 | Moore et al. | |
| 2005/0055299 A1 * | 3/2005 | Chambers et al. | 705/36 |

FOREIGN PATENT DOCUMENTS

| | | |
|---|---|---|
| EP | 0 918 424 | 5/1999 |
| EP | 0 955 595 | 11/1999 |
| EP | 1 115 075 | 11/2001 |
| WO | WO 00/54203 | 9/2000 |

OTHER PUBLICATIONS

American Express: Return on Sales Ratio, www133.americanexpress.com, p. 1.*

Donald Mango, Reinsurance Market Micristructure, Guy carpenter & Co. pp. 1-15, http://www.actuaries.org/ASTIN/Colloquia/Orlando/Papers/Mango2.pdf.*

Berger et al. : Reinsurance and the Liability Insurance Crisis, 1992, Journal of Risk and Uncertainty, 5:253-272.*

Article Entitled "What's New in Cybertalk?" by Gora, Jean , Oct. 2000, Published in Resource Magazine.

Article Entitled "The Insurance Industry: The Ecommerce Imperative?" Published by Deloitte & Touche LLP , Jan. 2000.

Examiner's Report From Canadian Patent Office Dated May 21, 2003.

Examiner's Report From Canadian Patent Office Dated Feb. 18, 2004.

Article entitled "Questions of Reinsurance" A Short Guide 1998.

Article entitled "An Introduction to Rating Casualty Business" by Ronald Grunig et al. 2000.

ManageReinsurance User Guide version 1.1 Dec. 5, 2001.

Article entitled "An Introduction to Reinsurance" 1996.

Insurance and Reinsurance Industry Business Methods and Software Intellectual Property Prior Art, Dec. 2001.

"Overview of Riskclick," http://www.riskclick.com.

"Reinsurance for the Third Milennium," http://marketing.rl3k.com.

"Inreon," http://www.inreon.com.

"Smartfac," http://www.smartfac.com.

"Platform—eReinsure " http://www.ereinsure.com.

* cited by examiner

AUCTION RANKING ELEMENT

| | | |
|---|---|---|
| ARE ID | 5131 | 41 |
| AUCTION ID | 322 | 42 |
| BID ID | 2057 | 43 |
| PROFITABILITY | 3.5 | 44 |
| CONSUMED CAPACITY | 20 MIL | 45 |
| STATUS ID | PARTIAL OK | 46 |
| RANK | 8 | 47 |
| TIME | 14:22:01 07/14/2001 | 48 |
| UPDATED | YES | 49 |

FIGURE 4

AUCTION DESKTOP

NEW BIDS

CHOOSE AN AUCTION FROM THE DROPDOWN LIST BELOW AND CLICK ON "ADD BID"

RUNNING ACTIONS: | SELECT AUCTION | | ADD BID | | RELOAD
BELGIUM
ML
                 ↑
                810

BID OVERVIEW

| AUCTION | BID NAME | COVER | SHARE % | BID | STATUS | TIME LEFT | | | |
|---|---|---|---|---|---|---|---|---|---|
| 1. BELGIUM | BID 1 | 10 000 | 100 | 0 | DRAFT | 22d 20h 45m | EDIT | | DELETE |
| 2. ML | BID 1 | 10 000 000 | 100 | 202 000 | OK | 22d 20h 45m | VIEW | RAISE | |
| 3. ISRAEL | BID 1 | 10 000 000 | 100 | 50 500 | PARTIAL OK | 22d 20h 45m | VIEW | RAISE | |
| 4. MARINE | BID 1 | 9 000 | 100 | 30 | EXCLUDED | 22d 20h 45m | VIEW | RAISE | DELETE | DRAFT |

| | | | |
|---|---|---|---|
| CURRENT ACTION | | | |
| NAME | CAPACITY | STATUS | START DATE(CET) | END DATE(CET) |
| ISRAEL AUCTION | 10 MILLION USD | ACTIVE | 26 10 2000 13:01 | 10 10 2001 06:00 |

PARAMETERS

| | | |
|---|---|---|
| TOTAL SUM INSURED | [ ] | MILLION USD |
| GNPI | [ ] | MILLION USD |
| DEDUCTIBLE | [ ] | MILLION USD |
| COVER | [ ] | MILLION USD |
| SHARE | [ ] | % |

| | | |
|---|---|---|
| BID NAME | [ ] | |
| INCEPTION DATE | [01 JANUARY 2001] | |
| MINIMUM BID FOR 100% SHARE | [NONE] | MILLION USD |
| MINIMUM BID FOR YOUR REQUESTED SHARE | [NONE] | MILLION USD |
| YOUR BID FOR REQUESTED SHARE | [ ] | MILLION USD |

[SAVE] [RESET]

[BID]

ON-LINE REINSURANCE CAPACITY AUCTION SYSTEM AND METHOD

This application claims the benefit of U.S. Provisional Application No. 60/236,713 filed Oct. 2, 2000, which is herein incorporated by reference in its entirety.

BACKGROUND

1. Field of the Invention

The present invention is directed to methods and systems for selling and procuring reinsurance. More specifically, the present invention is directed to on-line systems and methods for auctioning reinsurance capacity in one or more categories of insurable products.

2. Background of the Invention

Reinsurance is insurance for insurance companies. Reinsurance covers part of the risk assumed by a direct or primary insurer and, thus, reduces the risk that the direct or primary insurer will experience liquidity problems, or even suffer financial ruin, as the result of a major loss. Reinsurance also provides a means by which a direct insurer can make its portfolio more homogenous. Perhaps the most important advantage of reinsurance is that to the extent that risks with high sums insured and/or high exposures are reinsured, the direct or primary insurer's underwriting capacity can be increased because the reinsurer assumes a share of the risk assumed by the direct or primary insurer. Accordingly, a direct or primary insurer's available equity capital increases because reinsurance frees equity capital bound by risks.

FIG. 1 shows, in a hierarchical manner, the relationship among a reinsurance company, direct insurance companies and the ultimate purchasers of insurance products. Specifically, different groups of insureds 14 purchase insurance from several separate direct insurers 12a, 12b, 12c. In turn, to minimize risk and to maximize liquidity, each of the direct insurers 12a, 12b, 12c may purchase reinsurance from a reinsurer 10. Reinsurance companies thus act to distribute risks among the substantially larger number of direct insurance companies.

Conventionally, reinsurance is sold like direct insurance. That is, a reinsurance sales person develops a relationship with a direct insurance company and offers to the direct insurance company various products that the direct insurer may choose to purchase. For example, a reinsurance company might offer earthquake reinsurance for one geographic region and windstorm reinsurance for another geographic region.

There are two major models or types of reinsurance: proportional and non-proportional. In a proportional model, the reinsurer agrees to assume a predetermined percentage, for example, 70%, of a liability from a primary insurance.

The second model, the non-proportional model, involves the reinsurer taking a discrete slice of a total liability such as, for example, the total liability between $10 million and $300 million. Thus, the non-proportional reinsurance model allows the primary insurance company to build reserves by only covering the first $10 million (in the example given above) of the property and casualty loss.

In other words, terms of non-proportional reinsurance might include coverage of liability borne by the direct insurance company that exceeds a predetermined amount. In another example, the reinsurance company might offer a product that covers liability in the range of $50 million to $500 million for damage resulting from an earthquake in California. Thus, direct insurance companies would be liable to their insureds for up to $50 million and the reinsurance company would be liable for any additional exposure over the $50 million amount, and up to the $500 million amount. The direct insurance companies can thus free up capital that might otherwise have to be kept on reserve to cover the higher levels of exposure. The amount that the reinsurance company agrees to insure is called reinsurance "capacity." In the example above, the reinsurance capacity is $450 million, i.e., $500 million minus $50 million. It is noted also that a reinsurance company may only provide a capacity percentage, e.g., 30% of the $450 million. That is, in the case of a loss of $350 million, the reinsurance company would pay $90 million (30% of $350 million minus the $50 million).

While direct insurance companies and reinsurance companies are eager to do business with each other, there are several problems associated with the conventional sale of reinsurance products. First, it is very expensive and time consuming to employ reinsurance agents who must maintain relationships with direct insurers and sell products on a piece-meal basis.

Second, it is very difficult to determine whether the reinsurance company is obtaining the highest profit margin from the sale of its products. Using the conventional method of reinsurance sales, the only way to improve profitability is to review past sales of the reinsurance company's products to determine if a higher premium could have been obtained from another direct insurer for the same product.

Third, relatively small primary or direct insurers often do not have access to the offerings of large reinsurance companies since the reinsurance capacity sought is too small to justify contact by a reinsurance salesperson.

In addition, it is very difficult to determine, in real-time, whether a reinsurance company's capacity for a particular reinsurance product has been fully exhausted or whether capacity remains. Thus, if a direct insurer offers to buy from a salesperson a certain amount of capacity, the salesperson might not be able to immediately commit to the sale of a policy without first checking with a main office, for example, to confirm that the sufficient capacity remains such that the policy that is desired can be fully underwritten.

Accordingly, there is a need for improved techniques for selling and purchasing reinsurance products.

SUMMARY OF THE INVENTION

It is therefore an object of the present invention to facilitate the selling and purchasing of reinsurance products.

It is another object of the present invention to provide a system and method for auctioning capacity in reinsurance products.

It is also an object of the present invention to provide an on-line system and method for auctioning reinsurance products.

It is a further object of the present invention to provide a system and method for ranking bids in an on-line reinsurance product auction.

It is still another object of the present invention to provide a system and method for indicating, in real-time or near real-time, the status of a bid entered by a bidder.

It is also an object of the present invention to provide a system and method for maximizing the profits of a reinsurance company by selecting, from pending and newly-entered bids, bids that are most profitable.

It is also an object of the present invention to provide an on-line reinsurance product auction that harnesses the availability of the Internet.

These and other objects are achieved, and the concerns of conventional means of selling and purchasing reinsurance policies are addressed and overcome, by providing an efficient electronic marketplace to sell and purchase reinsurance.

In accordance with the present invention, primary or direct insurers bid against one another in a modified Dutch auction-type auction, wherein primary insurers commit to buying, at their respective offered bids, a certain amount of capacity and are each obligated to take a portion of the maximum capacity as determined by the reinsurer.

The present invention (the "Invention") is a platform for trading risks electronically. Employing the Internet, the Invention allows risk products buyers or intermediaries to engage in risk trading: simply, comfortably, and with a high standard of security. The Invention is an electronic market for risk trading and preferably offers standardized reinsurance products through an auction conducted over the Internet. Such a reinsurance distribution channel provides several advantages including:

Speed—within seconds, the Invention provides a price/quotation for standardized risk products.

Transparency—the Invention allows comparisons among prices/quotations of various products for different risks directly.

Savings—simpler underwriting via the Invention translates into lower risk assessment and transaction costs for the user.

Accessibility—the Invention is accessible over the Internet, and is preferably available 24 hours a day and 7 days a week.

While the Invention is designed primarily as a distribution channel for offering risk coverage to primary insurers, corporate clients, and intermediaries (e.g. brokers), it may also be employed to auction other products that can be organized in standardized categories. In the preferred implementation, however, the present invention supports the auctioning of reinsurance capacity for categories such as earthquakes, windstorms and marine catastrophes, as well as other well-known categories of insurance.

Generally, the Invention allows bidders to obtain a price, e.g., premium, that a reinsurance company is willing to accept to underwrite or reinsure a certain amount for a specific period of time. That price is considered the minimum acceptable price and a bidder can either bid that price or submit a higher priced bid thereby increasing his chances of, ultimately, having his bid accepted.

The reinsurance company preferably auctions predetermined blocks of reinsurance capacity. As each bid (which represents a predetermined amount of reinsurance) is accepted, the amount of available or remaining capacity is reduced, and at some point all of the capacity is used up or consumed. The auction ends at a predefined date and time, even if all of the capacity has not been sold.

As bids are accepted they are also preferably ranked. Ranking is preferably based on the profitability of the bid and the time the bid was received. Of course, other ranking methodologies may be employed depending on the circumstances and needs for a given type of auction. Bids that have relatively lower rankings may be excluded from the auction if a bid of higher profitability is received. The excluded bidder may then raise his bid or manipulate other variables, e.g., the amount of insurance or the time period over which the reinsurance is to run, in order to increase the ranking of his bid.

To ensure at least some measure of profitability for the reinsurance company or the operator of the auction, a fair risk price is preferably calculated for the reinsurance product being offered via the auction. For example, if an auction is being conducted in connection with capacity for insuring 1000 houses in Portugal against earthquake damage, the system preferably refers to historical data and constructs a scenario as to derive a fair risk price to be associated with each request for coverage. Methods for calculating such prices, or premiums, are well known in the art. A reference price is then further determined based on the fair risk price plus any costs associated with providing the reinsurance through the auction system, plus a desired profit margin.

It is this reference price that is preferably presented as an initial minimum acceptable bid in the auction. However, there may be occasions where a bid less than the reference price might be accepted in an effort to encourage bidders to use the auction.

A ratio of a bid to the reference price is referred to as an index. Thus, if, for example, the initial index is 0.8, the minimum bid is set at 80% of the reference price. However, as participants in the auction bid on the auctioned reinsurance product, it is likely the bids could rise above the reference price, in which case the index would be a number greater than 1.

In the preferred embodiment of the present invention, the capacity awarded in a given auction should be equal to the capacity that is put up for auction. However, in the typical case, the entire capacity that is offered will likely not be awarded to a single bidder. Thus, it is desirable to divide the total capacity award among the highest bidders. In such a circumstance, it is possible that one bidder will receive only a "partial fill" of his request. In a preferred embodiment of the present invention, bidders are obligated to accept both total and partial fills, so that optimization of order filling is more easily achieved.

The present invention will next be described in further detail in conjunction with associated drawings.

BRIEF DESCRIPTION OF THE DRAWINGS

FIG. 4 shows an auction ranking element in accordance with the present invention.

FIG. 8 illustrates an exemplary screenshot that is presented to a direct insurer that participates in the reinsurance auction in accordance with the present invention.

FIG. 9 illustrates an exemplary screenshot presented to a direct insurer for adding a new bid in the reinsurance auction in accordance with the present invention.

DETAILED DESCRIPTION OF THE INVENTION

The present invention, which is preferably implemented over the Internet, provides an electronic exchange for standardized risks. More specifically, the present invention can be considered a business-to-business (B2B) eCommerce application providing risk transfer or risk management tools for standardized reinsurance products. In the preferred implementation, an electronic reinsurance auction is established offering reinsurance coverage for products such as windstorms, earthquakes and marine catastrophes.

Figure 1:
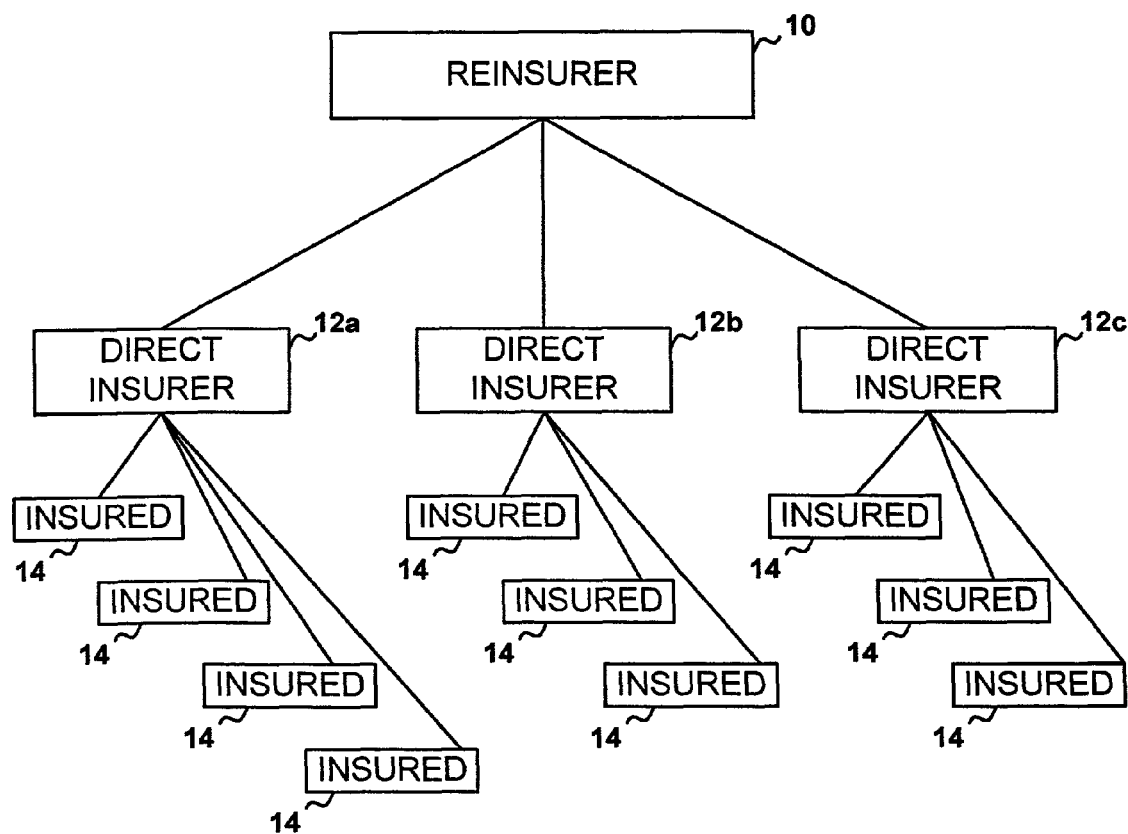
FIG. 1 illustrates the relationship between a reinsurer, direct insurers and several insureds.
Figure 2:
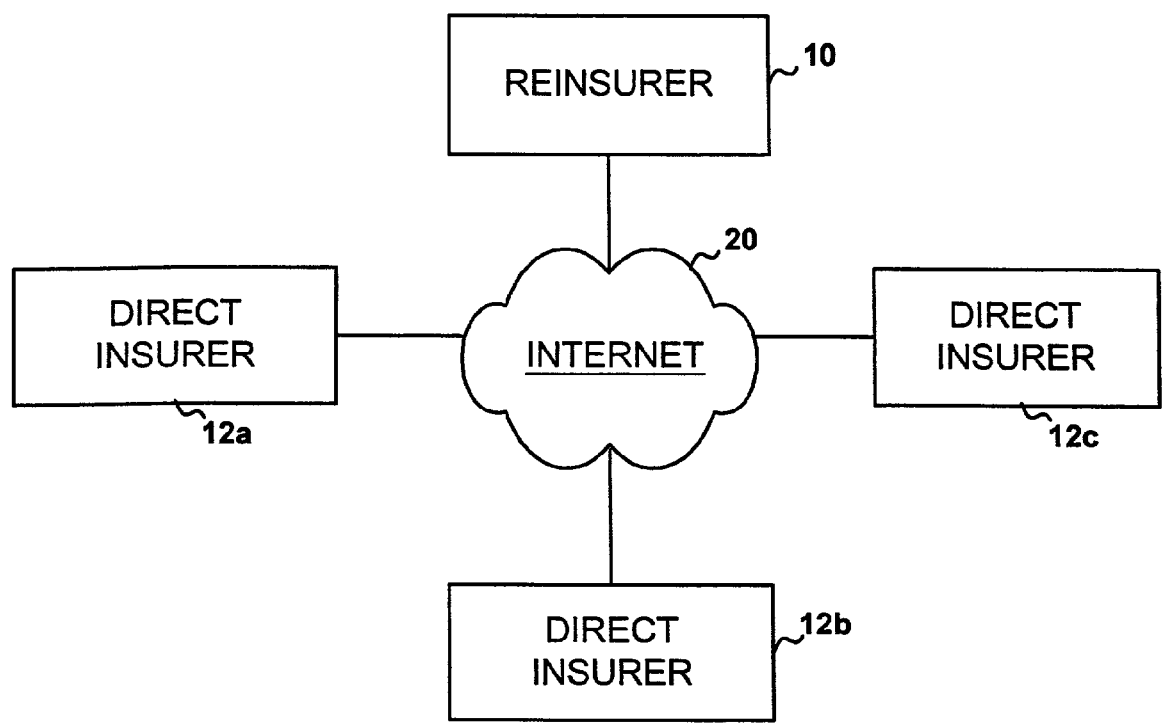
FIG. 2 illustrates preferable electronic connectivity between a reinsurer running an on-line reinsurance auction and several direct insurers in accordance with the present invention.

Referring now to FIG. 2, the on-line functionality of the present invention is preferably provided by the Internet 20. That is, reinsurer 10 is preferably in communication with each of the direct insurers 12a, 12b, 12c, as necessary or desired, via an electronic network such as the Internet 20. Of course, any private electronic communication network could also be implemented to achieve the connectivity between reinsurer 10 (or the entity that is running the auction of the present invention) and several direct insurers 12a, 12b, 12c (or, e.g., insurance brokers who may also be eligible to participate in the auction). However, in view of the relative ease with which it is possible to implement worldwide web-based applications, the Internet 20 is a preferable means of implementing the on-line features of the present invention. XML-based interfaces for interacting between the reinsurer 10 and direct insurers 12a, 12b, 12c are also contemplated by the present invention.

Figure 3:
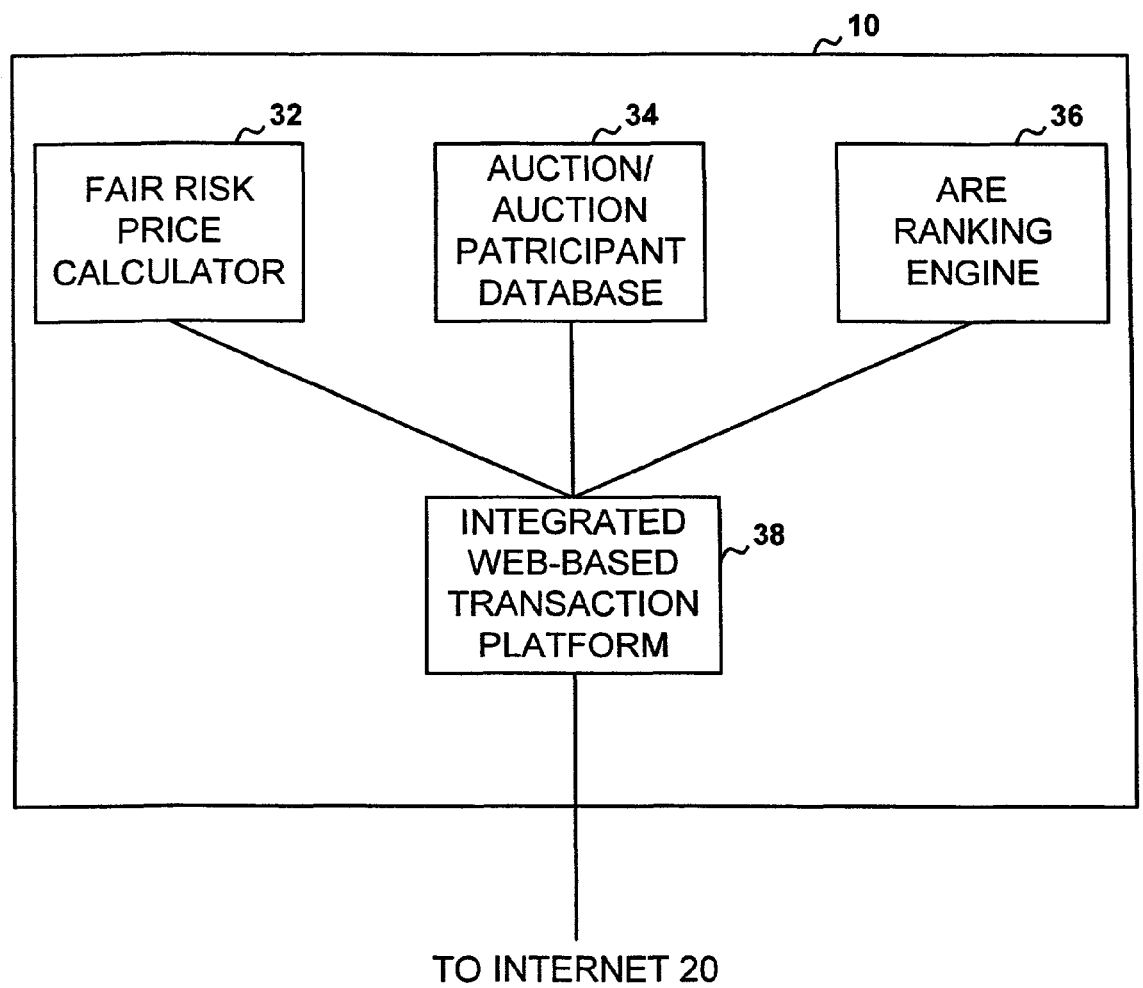
FIG. 3 depicts a schematic diagram of exemplary components for implementing a reinsurance auction in accordance with the present invention.

FIG. 3 depicts several components that are preferably employed to implement the on-line-reinsurance capacity-auction in accordance with the present invention. Specifically, reinsurer 10 preferably comprises or operates a fair risk price calculator 32, an auction and auction participant database 34, an auction ranking element (ARE) engine 36 and an integrated web-based transaction platform 38 (such as a web-server, for example) that is in communication with Internet 20.

Though not explicitly depicted in the figures, a prospective participant in the reinsurance auction in accordance with the present invention preferably registers via platform 38 by inputting conventional information such as name, telephone number, email address, company name, etc. This information is preferably stored in database 34. Ultimately, a unique user name and password is generated and communicated to the prospective participant, namely, one of the direct insurers 12a, 12b, 12c, so that the prospective participant can become eligible to bid on reinsurance products.

Database 34 also preferably stores information about the various reinsurance products that are to be offered to bidders. In a preferred embodiment, auctions can be added by reinsurer 10 at any time as long as the reinsurance product (earthquake, wind storm, marine) exists. Preferably, auctions can be inserted into database 34 with a date/time at which the auction is intended to begin. Then, when that date/time occurs, the auction is automatically activated and made available via web server 38.

Fair risk price calculator 32 is used to calculate, using known statistical methods in conjunction with historical data such as weather, seismic activity, value of insured location, etc., a break even premium value. To that break even value is preferably added the cost of overhead plus a certain level of profit. The resulting value is a reference priced it is this value that is preferably used as the minimum acceptable bid in an auction for a particular reinsurance product. When economics demand or permit, the reference price can be reduced by a certain percentage. The ratio of an acceptable bid to the reference price is known as an index value. Thus, for example, where a reinsurance product is first presented at an auction, reinsurer 10 may elect to promote the auction by setting the index value at 0.8 and hoping that bidders will push the bids sufficiently high to increase the index value to a number greater than 1.0.

Auction ranking element (ARE) ranking engine 36 plays an important role in the present invention. This component ranks bids as they are entered thereby determining which bids will be successful. An auction ranking element (ARE) is shown in FIG. 4 and preferably includes an ARE identifier 41, an auction identifier 42, a bid identifier 43, a profitability value 44, a consumed capacity 45, a status identifier 46, a rank 47, a time stamp 48, and an indication as to whether the ARE has been updated 49. Elements 41-43 are preferably integer values that are used to uniquely identify a particular ARE with respect to the several auctions and bids that might be active at any given moment. Indeed, each direct insurer 12a, 12b, 12c could conceivably bid multiple times in the same auction for the same product. Depending on the nature of such bids, their individual profitability values will be different. The notion of profitability will described in more detail later herein.

The consumed capacity value 45 provides the amount of reinsurance that the direct insurer is requesting in this particular bid. The status identification 46 will be one of "OK", "Partial OK" or "Excluded." Specifically, if the status identifier 46 is OK, this means that the aid has been accepted and,-assuming no better bids are received, the entire capacity that has been requested will be filled. A status identifier of Partial OK means that only a portion of the requested capacity in the bid will be filled. An Excluded status identifier indicates that the bid has not been accepted because, for example, there was no longer available capacity or the calculated profitability was unacceptable to reinsurer 10.

Rank 46 indicates where the particular ARE is ranked with respect to other AREs. The time 48 indicates the date and time that the bid was made and the updated field 49 indicates, with a "yes" or "no," whether the ARE has been updated or not.

In a preferred implementation, as soon as a new bid is added or a bid is raised, a new ARE (with a new ARE identifier 41) is created and ranked among the then-pending AREs. More particularly, whenever bid-ranking takes place, ARE ranking engine 36 scans through all of the AREs that belong to a particular auction to set status identifiers and ranks the bids. The following describes in more detail how a preferable ranking algorithm in accordance with the present invention operates.

When a bid is submitted, an ARE is generated and ranked within the corresponding auction according to the following parameters in the order as listed:

Profitability: The higher the profitability, the higher the rank.

Time Stamp: The older the time stamp the higher the rank. That is, when a new ARE is inserted, the following process is preferably implemented to update the AREs.

1. The available capacity from the auction is loaded.

2. The AREs are visited according to their rank as determined by the foregoing criteria. The ARE with rank 1 is visited first and its consumed capacity is subtracted from the available capacity.

3. The next ARE is visited until the new ARE is reached.

If the available capacity is 0 or negative, the new ARE is assigned the status Excluded. If the available capacity is negative after the consumed capacity has been subtracted, the new ARE is assigned a status of Partial OK. If the available capacity is 0 or positive after the consumed capacity has been subtracted, the new ARE is assigned the status OK. The update flag is then set.

4. All AREs ranked below the new AREs are treated as follows:

If the available capacity is 0 or negative and the status of the ARE is not Excluded, the ARE is assigned the status Excluded and the update flag is set. If the available capacity is negative after the consumed capacity has been subtracted and the status of the ARE is not Partial OK, the ARE is assigned the status Partial OK and the update flag is set. The rank is then recalculated.

In a preferred implementation of the present invention, the status of an ARE is permitted to move from OK to Partial OK and from Partial OK to Excluded. A status is also preferably permitted to transition from OK to Excluded. However, it is preferred that a change in an ARE status from Excluded back to Partial OK or OK, or from Partial OK to OK, not be permitted without at least some prior notice, as such transitions could unpleasantly surprise a direct insurer that believes that it was no longer in the running to obtain a reinsurance policy within a particular auction.

Figure 5:
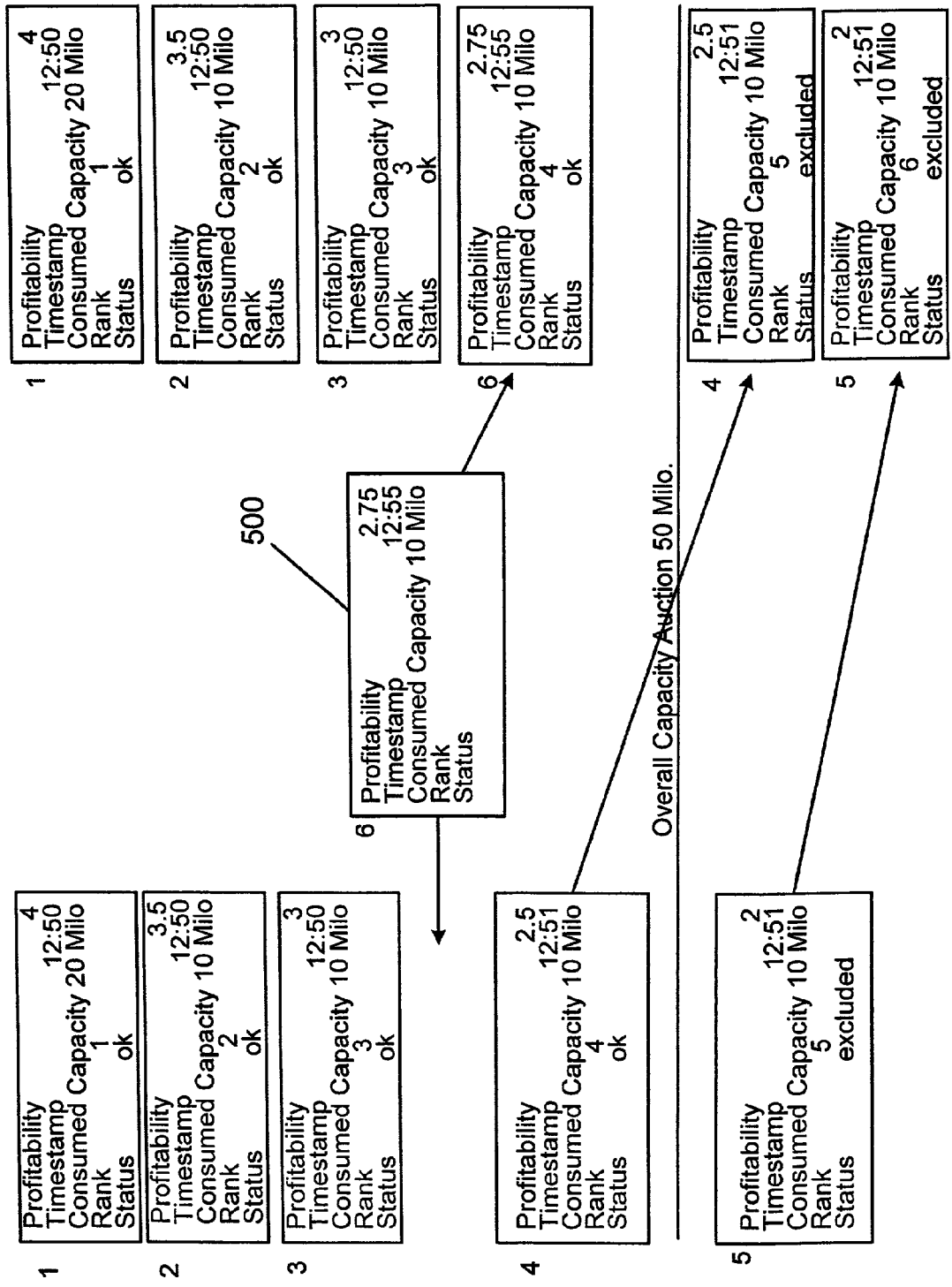
FIGS. 5-7 illustrate different scenarios of a new bid being received in the reinsurance auction of the present invention.
Figure 6:
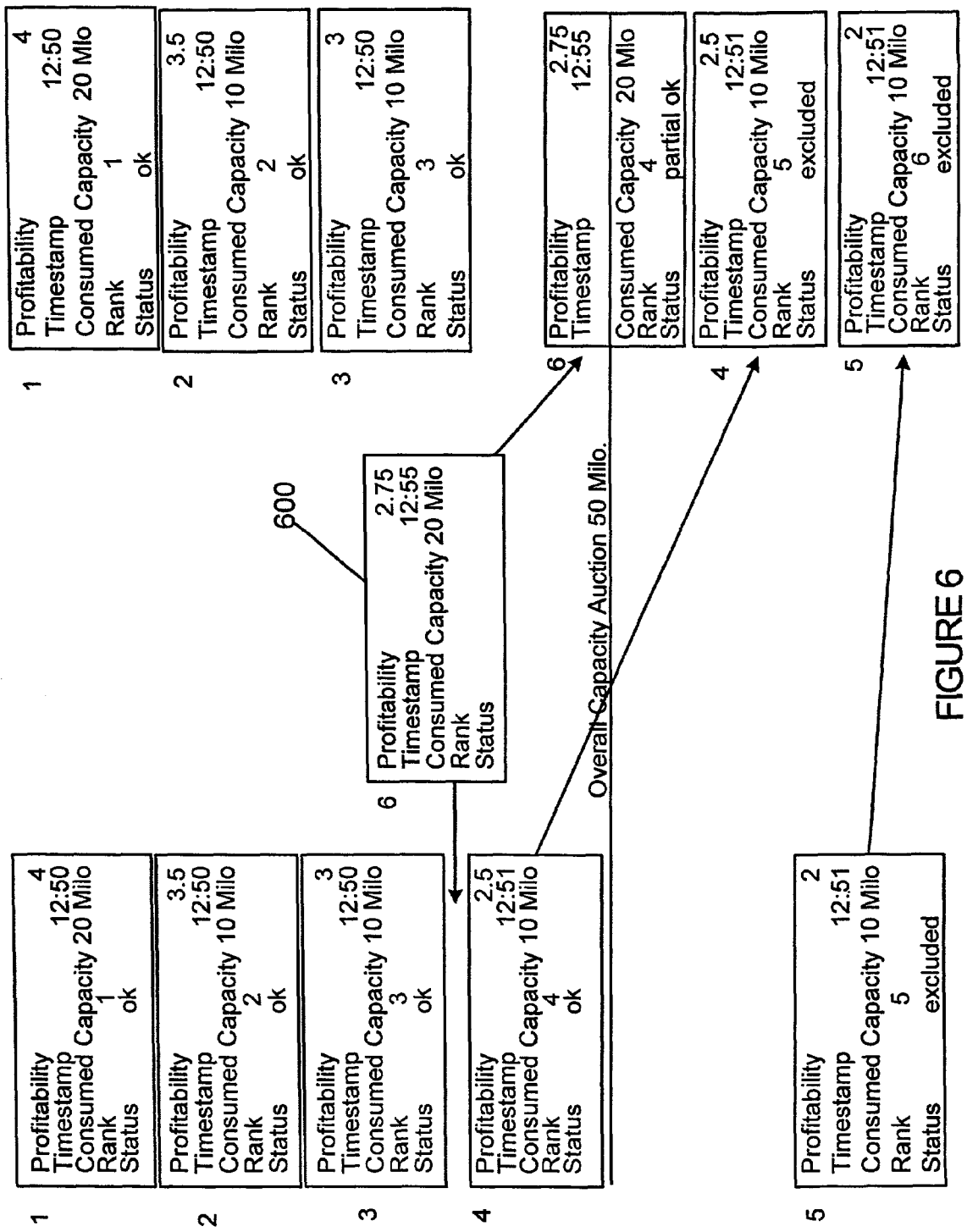
Figure 7:
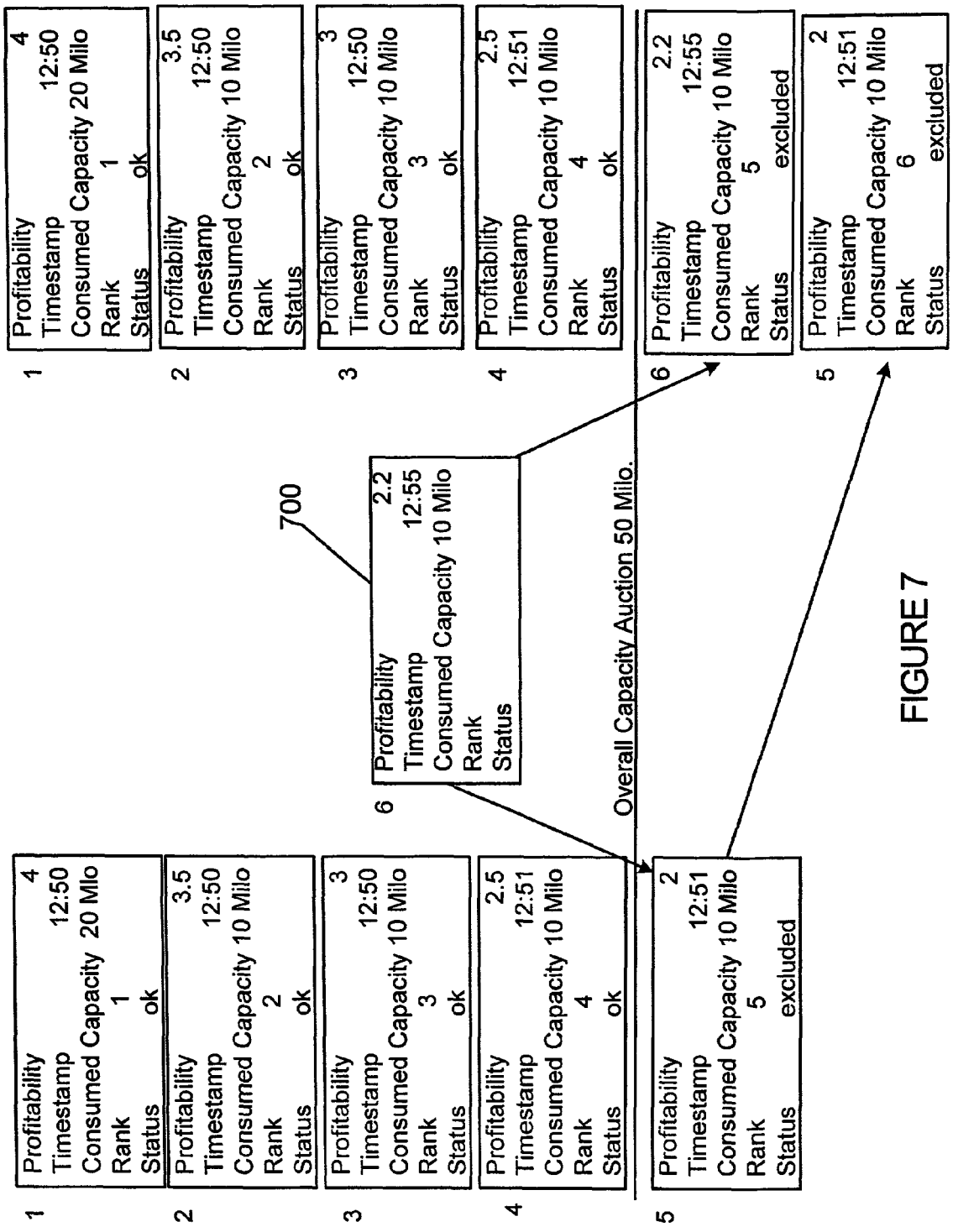

FIGS. 5-7 depict scenarios in which new AREs are ranked. In the figures, pre-existing AREs are ranked on the left hand side and a new ARE (shown in the middle of each of the figures) is added and must be ranked. The right hand side of FIGS. 5-7 shows the result of the re-ranking of the AREs in view of the new ARE that has been added. In FIG. 5, new ARE 500 has a profitability value of 2.75 which is greater than the 2.5 profitability value of the fourth ARE, but less than the 3.0 profitability value of the third ARE. Since there is sufficient capacity, the entire bid associated with new ARE 500 becomes successful. Its status becomes OK and the ARE with the profitability value of 2.5 has its status changed to Excluded. The bidder (direct insurer) associated with ARE 500 is preferably sent an email confirming the successful bid. Also, a paper contract may also be sent via conventional mail to memorialize the contract once the auction closes. The bidder whose bid became Excluded is also preferably notified via email. That bidder then preferably has the option of raising his bid or changing other bid parameters to obtain the coverage originally sought.

FIG. 6 shows a new bid that is represented by an ARE 600 that is entered into the system. In this case, the bid's requested capacity can not be fully satisfied. More specifically, the capacity consumed by the fourth ARE (which ultimately becomes excluded) is not sufficient to satisfy the capacity in the new ARE 600. Thus, new ARE 600 is given a status of Partial OK. The bidder, however, preferably has the opportunity to raise his bid to acquire the full desired capacity. Alternatively, the bidder can opt to stay with the capacity as allocated.

FIG. 7 shows how a new ARE 700 that has a profitability value of 2.2 (which is lower than any of the already-pending bids) is immediately excluded since all of the capacity, in this case $50 million has already been accounted for.

Though not shown in the figures, in the case that a new bid is entered that has a profitability value equivalent to the profitability value of another bid, the bid that was received first in time preferably ranked first.

FIGS. 8 and 9 depict exemplary screenshots of web pages that are made available to direct insurers via web server 38. Specifically, FIG. 8 depicts an auction desktop 800 that is a personalized workplace for monitoring the several bids that may be active in the reinsurance auction of the present invention. More specifically, the screen preferably displays an overview of all of the bids that have been entered. If no bids have been entered, then none is listed. A pull-down 810 menu is provided for selecting an auction in which a new bid can be added. A separate screen 900 for adding a new bid is described with respect to FIG. 9.

Referring to FIG. 8, under the Bid Overview heading, there are a number of columns that are displayed. An AUCTION column provides the name of the auction indicating the auctioned product. A BID NAME column indicates the name of the auction participant's bid. The COVER column indicates the desired coverage. The SHARE % column indicates the requested share. More specifically, direct insurers often spread their risk among several reinsurers. By indicating a share, the direct insurer can specify what percentage of the risk it desires the reinsurer to cover. The BID column identifies the amount of the current bid, the STATUS column indicates the status of the bid and the TIME LEFT column indicates the remaining time for the particular auction.

As previously explained with respect to AREs, a bid can have one of the following statuses: OK, Partial OK or Excluded. In addition, as shown in line item 4 in FIG. 8, a bid can have a DRAFT status, which means that bid parameters have been entered into the system but the bid itself has not been submitted to the auction.

As is apparent from screen 800, the auction desktop is the starting point for adding new bids, and monitoring and modifying pending bids that have already been entered. In a preferred implementation, the auction desktop is automatically refreshed every minute to display the latest status of each of the bids.

To the right of the columns described above, a number of buttons may be displayed with respect to each one of the bid line items. A RAISE button links to a raise bid page and permits a bid amount to be increased. A VIEW button links to a page that displays the details of the bid. An EDIT button links to a page that permits modification of a draft bid. A DRAFT button transforms an excluded bid into a bid with a status of Draft, and a DELETE button deletes a bid. However, in accordance with a preferred implementation of the present invention, only excluded bids or bids with the status draft can be deleted. That is, in the preferred implementation of the present invention, participants in the auction guarantee that if their bid is accepted, they will purchase the reinsurance product.

If a bidder's bid is ranked higher than a pending bid and further causes the pending bid's status to change to Partial OK or Excluded, the owner of the pending bid is preferably informed via email that his pending bid has either been Excluded or partially excluded. This offers the participant an opportunity to raise the bid, or change other bid parameters, in order to obtain the reinsurance product that was originally sought.

When a new bid is desired, a participant selects the reinsurance product from the select auction pull-down menu and clicks on the ADD BID button. This causes screen 900 of FIG. 9 to be displayed on a web browser belonging to the bidder (i.e., direct insurer 12a, 12b or 12c). Screen 900 displays information about the current auction including the name of the auction, the total capacity of the auction, the status of the auction, as well as the start and end date of the auction. The user then inputs information (bid parameters) that will be used to generate a bid (or draft bid) in this auction. Parameters depend on the reinsurance product type, but typical parameters include the total sum insured, Gross Net Premium Income (GNPI), a deductible, an amount of coverage, a share percentage, a bid name, an inception date and an actual bid. The SAVE button saves the bid as a draft and lists the draft bid on the auction desktop as shown in FIG. 8. The RESET button clears all parameters that have been entered. The BID button submits the entered bid to the auction. As previously mentioned, once the bid is submitted and accepted, the user is preferably bound to purchase the requested amount of reinsurance capacity.

The profitability value used in the ARE ranking is preferably calculated using the parameters entered in the screen of FIG. 9. Using predetermined coefficients, the different parameters are weighted to achieve a profitability value that can be used to compare one ARE to another ARE. The profitability value is useful because not all bids are alike. Some bids seek more capacity than others, while some bids seek coverage inception dates that begin earlier than other bids' inception dates for the same reinsurance product. How profitability is calculated will depend on how a reinsurance company values different parameters and thus there is no set or preferred profitability calculation. However, as a-general guide, profitability is often calculated using a return on sales ratio (i.e., selling price minus fair risk price divided by selling price or selling price divided by fair risk price).

An auction preferably lasts for a period that is determined by reinsurer 10 or the auction operator. During that time, bids can be placed and the status of the auction can be checked on the auction desktop.

Thus, as is apparent from the foregoing, the present invention provides an online reinsurance auction that, using risk models and the like, calculates a reference price, premium or minimum price that is presented to the user or bidder. The bidder then enters a bid that is at least as high as the calculated reference price, or an indexed reference price. If there is sufficient capacity remaining in the category of reinsurance being auctioned, the bid is classified as OK and the amount of coverage that the bid corresponds to is deleted from the remaining capacity of the product being auctioned. The process continues until all capacity is sold, or the auction is closed after a preset amount of time. Preferably, all communication between auction server(s) operated by the reinsurance company and the computer(s) of the direct insurer is implemented using Internet security measures, including well-known encryption techniques such as SSL.

In the preferred embodiment, no one bidder is necessarily the only winner. Rather, all bidders who have bids classified as OK or Partial OK when the auction closes are winning bidders and each pays their bid as the premium in exchange for the reinsurance product. Additionally, in view of the fact that capacity is being auctioned in the way described, the present invention supports the non-proportional method of reinsurance underwriting.

The foregoing disclosure of the preferred embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A method for auctioning reinsurance products electronically over a communication network, comprising the steps of:
   identifying a reinsurance product based on information stored in a database associated with a system;
   determining, by a server, capacity of the reinsurance product to be sold;
   offering, by the server, the reinsurance product for sale through an auction;
   accepting, by the server, bids from reinsurees for at least a portion of the capacity, wherein the step of accepting bids includes,
      providing, through the communication network, a status for the bids of the reinsurees, the status comprising one of OK, Partial OK, and Excluded, the status OK representing that a bid will be accepted the status Partial OK representing that only a portion of the capacity in a bid will be filled, and the status Excluded representing that a bid will not been accepted, and
      ranking, by an auction ranking element engine, the bids of the reinsurees, wherein the ranking of the bids at least considers a calculated profitability value and a time stamp associated with each of the bids an older time stamp resulting in a higher ranking for a given bid and a higher calculated profitability resulting in a higher ranking for a given bid, and where profits for a provider of the reinsurance product are maximized by selecting from pending and newly entered bids, the bids that are most profitable;
   setting, by the server, a reference price for the reinsurance product;
   defining, by the server, a ratio of a bid to the reference price that defines a variable index;
   using, by the server, the variable index to define profitability, wherein remaining capacity of the reinsurance product is sold when the variable index is below 1;
   electronically consummating a contract, using the communication network, for the sale of at least a portion of the reinsurance product to holders of winning bids, and assigning each of the winning bids a status of OK denoting denotes acceptance of a bid, or a status of Partial OK denoting only a portion of requested capacity will be filled; and
   ending, by the server, the on-line auction in response to a determination that the capacity is consumed or a predefined date and time is reached, even if all of the capacity has not been sold.

2. The method of claim 1, wherein the reinsurance product is at least one of earthquake reinsurance, windstorm reinsurance and marine catastrophe reinsurance.

3. The method of claim 1, wherein the auction comprises an on-line auction.

4. The method of claim 3, wherein the auction employs the Internet.

5. The method of claim 3, wherein the auction is presented via a browser.

6. The method of claim 1, further comprising accepting bids from at least one of direct insurers and brokers.

7. The method of claim 1, wherein bids comprise at least a bid amount and an indication of the amount of desired capacity.

8. The method of claim 1, wherein the calculated profitability value associated with each of the bids is calculated based a return on sales ratio.

9. The method of claim 8, wherein the return on sales ratio is a selling price minus a fair risk price divided by the selling price or the selling price divided by the fair risk price.

10. The method of claim 8, further comprising changing a status of at least one bid.

11. The method of claim 10, wherein the status is one of OK, Partial OK and Excluded.

12. An online system for auctioning a reinsurance product electronically over a communication network, comprising:
   a fair risk price calculator;
   an auction and auction participant database;
   an auction ranking element engine; and a web server in communication with the Internet, wherein the fair risk price calculator provides information for calculating a minimum bid, the database stores information related to at least one auction for at least one reinsurance product, and the auction ranking element engine is operable to rank bids submitted to the database via the web server from reinsurees, wherein the ranking of the bids of the reinsurees at least considers a calculated profitability value and a time stamp associated with each of the bids an older time stamp resulting in a higher ranking for a given bid and a higher calculated profitability resulting in a higher ranking for a given bid, and where profits for a provider of the reinsurance product are maximized by selecting from pending and newly entered bids, the bids that are most profitable, wherein the web server sets a reference price for the reinsurance product, defines a ratio of a bid to the reference price that defines a variable index, and uses the variable index to define profitability, wherein remaining capacity of the reinsurance product is sold when the variable index is below 1; and wherein the auction ranking element engine provides a status of a bid, and wherein a status of OK denotes acceptance of a bid, a status of Partial OK denotes only a portion of requested capacity will be filed, and a status of Excluded denotes that a bid has not been accepted, and the web server ends the on-line auction in response to a determination that the capacity is consumed or a predefined date and time is reached, even if all of the capacity has not been sold.

13. The system of claim 12, wherein the reinsurance product is at least on of earthquake reinsurance, windstorm reinsurance and marine catastrophe reinsurance.

14. The system of claim 12, wherein the calculated profitability value associated with each of the bids is calculated based a return on sales ratio.

15. The system of claim 12, wherein direct insurers submit bids to the web server.

16. The system of claim 12, wherein a submitted bid comprises a bid amount and a desired coverage amount.

17. The system of claim 16, wherein the auction ranking element engine determines whether the sufficient capacity remains to satisfy the desired coverage amount.

18. The system of claim 12, wherein the system is operated by or on behalf of a reinsurance company.

19. The system of claim 12, wherein the direct insurers participate as bidders for the reinsurance product.

* * * * *